C. KARNATZ.
FERTILIZER DISTRIBUTER.
APPLICATION FILED MAR. 14, 1910.
964,787.
Patented July 19, 1910.
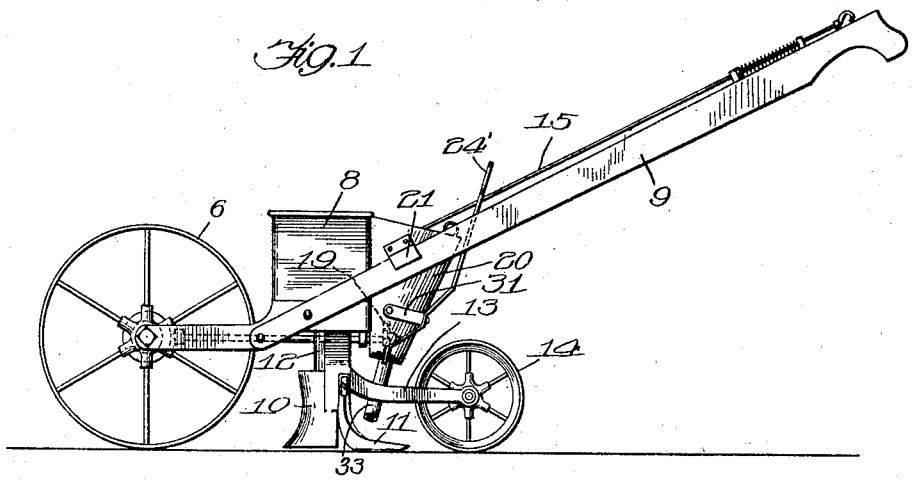
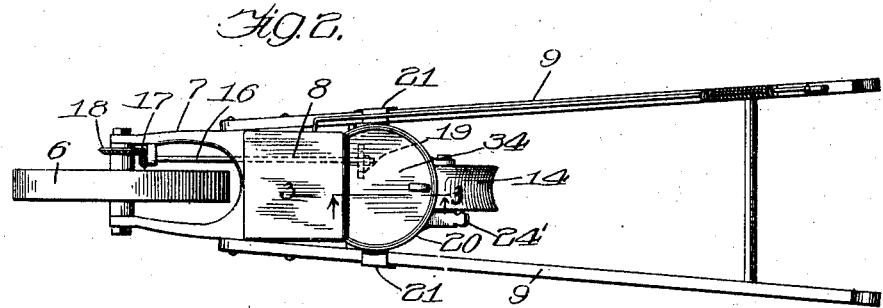
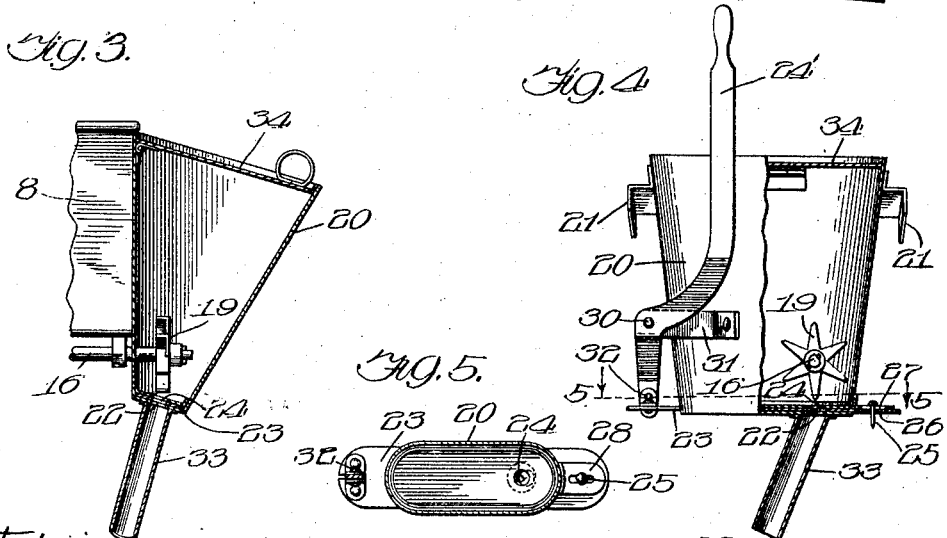
Witnesses:
Inventor:
Charles Karnatz.
By Linthicum Bell + Fuller
Att'ys

UNITED STATES PATENT OFFICE.

CHARLES KARNATZ, OF CHICAGO, ILLINOIS.

FERTILIZER-DISTRIBUTER.

964,787.   Specification of Letters Patent.   Patented July 19, 1910.

Application filed March 14, 1910. Serial No. 549,268.

*To all whom it may concern:*

Be it known that I, CHARLES KARNATZ, a citizen of the United States, residing at Chicago, in the county of Cook and State of Illinois, have invented certain new and useful Improvements in Fertilizer-Distributers, of which the following is a specification.

This invention relates to a fertilizer distributing device which is particularly adapted to be attached to a seed-planter. As is well known, planters of this character are so constructed that they may be used both as hill-seeder and as drill-seeder. The shaft which operates the seed feeding mechanism is ordinarily provided with a dropper-wheel at its rear end; this wheel being adapted to intermittently operate an attachment to the seeder which delivers the seed at intervals, or, as it is ordinarily termed, drops the seed in hills. In localities where the use of a fertilizer is necessary, it is essential that the fertilizer be distributed in the furrows with the seed in order to obtain the best results therefrom.

My invention has for one of its objects the provision of a fertilizer distributer which can be readily attached to a hand-planter of the general type described, when the hill dropping mechanism or attachment is removed.

Another object of my invention is the provision of a fertilizer distributer of this character which can be attached to the seeder so that the dropper-wheel which ordinarily runs idle when the dropping attachment is removed, will act as an agitator in the fertilizer hopper to insure the discharge of the fertilizer from the hopper.

Still another object is the provision of a fertilizer distributer in which the quantity of fertilizer discharged can be regulated by adjusting the size of the discharge opening; and, furthermore, my invention provides means whereby the discharge opening can be manually closed when it is desired to stop the distribution of the fertilizing material.

The following description when taken in connection with the accompanying drawings which illustrate a preferred embodiment of my invention, will sufficiently disclose its structure and mode of operation.

Referring to the drawings—Figure 1 is an elevation of a seed-planter embodying my invention. Fig. 2 is a plan thereof. Fig. 3 is a sectional elevation of the fertilizer distributing hopper on line 3—3 of Fig. 2. Fig. 4 is a rear elevation of the hopper and discharge controlling mechanism, part of the hopper being broken away to disclose the agitator therein. Fig. 5 is a section on the line 5—5 of Fig. 4.

Referring to the drawings, 6 indicates the driving-wheel of a planter or seeder, which is journaled in the frame 7, carrying the seed-hopper 8. Secured to either side of the frame and extending upwardly and rearwardly therefrom, are ordinary handles 9. A plow 10, is disposed beneath the seed hopper. The covering hoes 11 are secured to the member 12 which is provided with a pair of rearwardly extending arms 13, between which is journaled the presser-wheel 14.

The seed-hopper is provided with the usual seed feeding mechanism which it will be unnecessary to disclose in this application since the construction is well understood and may be of any preferred type. An operating rod 15 extending along one of the handles 9, is adapted to be manipulated to shut off the discharge of seed from the hopper whenever desired. The seed feeding mechanism is operated by a shaft journaled in the frame of the machine and carrying a bevel-gear 17 adapted to mesh with and be driven by bevel-gear 18 on the hub of the driving-wheel. Upon the rear end of the shaft 16 there is removably secured, the dropper-wheel 19. The dropping attachment with which these planters are supplied, is of well known construction, it being sufficient to state for the purpose of this application, that when the dropping attachment is in operative position on the planter, a member is disposed in the path of the dropper-wheel 19. As the wheel revolves its arms are successively engaged with the dropping member to actuate the dropping mechanism, whereby the seeds are planted or dropped in hills.

All of the above mechanism may be of the usual well known construction, and this invention relates to a fertilizer distributing attachment adapted to be used in connection with a planter of the above type, so that the dropper-wheel which ordinarily runs idle when the planter is being used as a drill-seeder, will act as an agitator in the fertilizer hopper to insure the discharge of the fertilizer in the desired quantity.

A hopper 20, preferably made smaller at the bottom so that the fertilizer will feed downwardly therein, is provided on either side with ears or shoulders 21 which are adapted to hook over the handles 9 and support the hopper in operative position against the rear side of the seed-hopper 8. The hopper is provided with an opening in its side wall adapted for the reception of the end of the shaft 16, it being necessary, of course, that the dropper-wheel be removed from the shaft when the fertilizer hopper is placed in position. The dropper-wheel is then replaced on the shaft and is adapted to rotate near the bottom of the hopper and directly over a discharge opening 22 therein. As will be apparent from Figs. 3 and 4, the bottom of the hopper is made double and the discharge opening 22 extends through both sections thereof.

A slide 23 adapted to be moved longitudinally between the sections of the bottom of the hopper, is provided with an opening 24 of substantially the same shape and size as the openings 22 and normally disposed in alinement therewith. The slide 23 can be adjusted to vary the position of the opening 24 relatively to the openings 22 for the purpose of regulating the discharge from the hopper, by means of a pin 25 which may be positioned in any of the holes 26 in the slide 23, and is limited in its movement by the ends of a slot 27 in a bracket 28 projecting laterally from the hopper. The discharge opening may be closed entirely to shut off the flow of fertilizer whenever desired, by means of a hand-lever 24' pivoted at 30 on a bracket 31 secured to the hopper, and pivoted at its lower end to the slide 23.

It will be evident from Figs. 2, 4, and 5, that the dropper-shaft 16 is disposed at one side of the center of the machine. The opening in the fertilizer hopper is necessarily at one side thereof to accommodate this shaft, and the discharge opening which must necessarily be located in proximity to the agitator, in order that the fertilizer may be forced out, is also disposed near one end of the bottom of the fertilizer hopper. In order that the fertilizer may be distributed in the furrow with the seed directly behind the plow 10, I have provided a discharge tube 33 communicating with the discharge openings 22 and 24, the discharge tube being inclined so that its lower end is positioned directly over the center of the furrow made by the plow. The top of the fertilizer hopper is preferably provided with a hinged cover 34.

From the above description it will be evident that by simply removing the dropper-wheel from the dropper-shaft, the fertilizer hopper may be readily attached to the seeder, and that when the dropper-wheel is replaced on its shaft, it is disposed directly over and adjacent to the discharge opening from the fertilizer hopper. The hopper may now be filled with fertilizer and when the machine is set in operation the dropper-wheel will revolve and act as an agitator in the fertilizer hopper to loosen up the fertilizer and force it through the discharge opening. The size of the discharge opening can be regulated by placing the pin 25 in one of the openings 26, and the flow of fertilizer can be shut off entirely by simple manipulation of the hand-lever 24'.

My invention is simple in construction and cheap to manufacture, and can be readily and quickly attached to any seeder or planter which is provided with a dropping attachment of the general character disclosed. It will be obvious, however, that various minor mechanical changes may be resorted to without departing from the spirit of the invention or sacrificing any of the material advantages thereof, and therefore, I do not wish to be restricted to the exact modification disclosed, but refer to the appended claims as disclosing the true scope of my invention.

What I claim is:

1. A fertilizer distributing device comprising a hopper having a flat face adapted to be positioned against the side of a seed-box, ears projecting laterally from said hopper and adapted to removably secure said hopper to a seeder, said hopper being provided with a discharge opening in the bottom thereof and a shaft receiving opening in the flat face thereof, means for regulating the size of said discharge opening, manually controlled means for closing the discharge opening, an inclined tube communicating with said discharge opening and adapted to discharge the contents of the hopper at one side of the discharge opening in the hopper and in alinement with the discharge from the seed-box, and a hinged cover adapted to close the top of the hopper.

2. The combination with a drill-seeder comprising a seed-hopper, handles connected thereto, a dropper-shaft, and a dropper-wheel mounted thereon, of a fertilizer distributing device comprising a hopper provided with shoulders adapted to engage the seeder-handles, and an opening in the side of the hopper for the reception of the dropper-shaft, whereby the dropper-wheel may be positioned within the fertilizer hopper, an inclined discharge tube connected to the bottom of said hopper and in communication with a discharge opening in the bottom of said hopper, and means for regulating the size of said discharge opening.

CHARLES KARNATZ.

Witnesses:
S. J. WILSON,
M. ROBERTSON.